US 6,640,529 B2

(12) United States Patent
Lemke et al.

(10) Patent No.: US 6,640,529 B2
(45) Date of Patent: Nov. 4, 2003

(54) COTTON PICKER MOISTENER SUPPLY SYSTEM

(75) Inventors: Dwight D. Lemke, Geneseo, IL (US); Frank C. Dupire, Sherrard, IL (US)

(73) Assignee: Case, LLC, Racine, WI (US)

( * ) Notice: Subject to any disclaimer, the term of this patent is extended or adjusted under 35 U.S.C. 154(b) by 15 days.

(21) Appl. No.: 09/912,037

(22) Filed: Jul. 24, 2001

(65) Prior Publication Data

US 2003/0019200 A1 Jan. 30, 2003

(51) Int. Cl.[7] ................................................ A01D 45/02
(52) U.S. Cl. ................................................ 56/64; 56/51
(58) Field of Search ................................. 56/36, 41, 50, 56/40, 42, 43, 44, 45, 46, 47, 25; 15/256.5

(56) References Cited

U.S. PATENT DOCUMENTS

| | | | |
|---|---|---|---|
| 2,140,631 A | | 12/1938 | Johnston |
| 2,593,671 A | | 4/1952 | Hagen et al. |
| 2,795,917 A | * | 6/1957 | Meier ............................. 56/44 |
| 3,212,676 A | * | 10/1965 | Trumbull et al. ............. 222/76 |
| 3,591,889 A | * | 7/1971 | Wisher ........................ 15/321 |
| 4,019,652 A | * | 4/1977 | Suh et al. ....................... 222/1 |
| 4,062,472 A | * | 12/1977 | Taube ............................ 222/1 |
| 4,461,140 A | | 7/1984 | Carmi et al. |
| 4,529,000 A | * | 7/1985 | Funk ........................... 137/99 |
| 4,538,403 A | | 9/1985 | Fachini |
| 4,850,184 A | | 7/1989 | Deutsch et al. |
| 4,852,802 A | * | 8/1989 | Iggulden et al. .............. 239/64 |
| 4,905,464 A | | 3/1990 | Thedford |
| 4,914,897 A | | 4/1990 | Orsborn |
| 4,972,663 A | | 11/1990 | Richman et al. |
| 5,018,343 A | * | 5/1991 | Finke .......................... 56/12.1 |
| 5,212,937 A | | 5/1993 | Fachini et al. |
| 5,355,663 A | | 10/1994 | Deutsch et al. |
| 5,467,582 A | * | 11/1995 | Panoushek et al. ...... 56/10.2 R |
| 5,471,826 A | | 12/1995 | Schreiner |
| 5,499,491 A | | 3/1996 | Deutsch et al. |
| 5,722,224 A | | 3/1998 | Sheldon, Jr. et al. |
| 5,896,617 A | * | 4/1999 | Kasen et al. .................. 15/320 |

OTHER PUBLICATIONS

Case Corporation, *Case North American Buyer's Guide*, 2555 Cotton Express® Pickers, http://www.casecorp.com, (Feb. 6, 2001).

C.B. Ogburn, *Cotton Picker Management and Harvesting Efficiency*, http://www.aces.edu (Feb. 6, 2001.

* cited by examiner

*Primary Examiner*—Thomas B. Will
*Assistant Examiner*—Alicia Torres
(74) *Attorney, Agent, or Firm*—Rebecca Henkel

(57) ABSTRACT

A moistener supply system for a cotton picking machine including a cleaner injection system that supplies cleaner to the system from a location remote from a water tank or other source of water. The outlet of the cleaner injection system preferably is positioned at a location that assures good mixing of the cleaner with the water before the resultant moistener is dispensed onto the moistening pads. Cleaner flow rate preferably is slaved to the water flow rate in order to maintain a generally constant cleaner concentration in the moistener in the absent external intervention. The cleaner flow rate can also be adjusted independently of the water flow rate to vary the cleaner concentration to meet the needs of the prevailing operating conditions. The cleaner concentration adjustment may be effected manually, automatically, or a combination of both.

14 Claims, 5 Drawing Sheets

COTTON PICKER MOISTENER SUPPLY SYSTEM

BACKGROUND OF THE INVENTION

1. Field of the Invention

The invention relates to a system for moistening the spindles of a cotton picking machine and, more particularly, to a moistener supply system having a cleaner injection system that is adapted to permit selective variation of the cleaner concentration of the moistener. The invention additionally relates to a method of supplying moistener to moistening pads of a cotton picking machine.

2. Discussion of the Related Art

In cotton picking machines of known design, such as exemplified by the Model 2555 Cotton Picker available from Case Corporation, cotton fibers are harvested from mature cotton plants by rotating spindles that contact the cotton bolls and strip the fibers from the plants. The spindles are generally arranged in vertical columns. Eighteen vertically-spaced spindles are typically mounted on each column. The columns are mounted on rotors that rotate about vertical axes within drum units. Four to six drum units are provided on the front of a typical picking machine, with each drum unit being configured to harvest cotton from one row. In some machines, each drum unit includes two rotors, one located behind the other.

The revolutionary path of the spindles on the rotors is designed to produce a low relative velocity between the spindles and the cotton plants to allow the spindles to strip the cotton fibers from the plants by their horizontal rotation. At another location on their revolutionary path, each column of spindles passes a column of doffers, where the cotton fibers are pulled or "doffed" from the spindles and blown into a hopper by an air stream generated by a fan.

Moistening pads are provided at still another location in the revolutionary path of the spindles to wipe the spindles and apply a moistener to them, thereby reducing the accretion of foreign materials that would otherwise reduce the harvesting efficacy of the spindles. The pads associated with each rotor are arranged in a moistener assembly, usually grouped in a vertical column and oriented such that one pad contacts each spindle as the spindles sweep past the pads during their revolution within the drum unit. A detailed description of a cotton picking machine of the type described is provided in U.S. Pat. No. 4,905,464, which issued to Thedford on Mar. 6, 1990, and which is of common ownership with the present invention.

Cotton picking machines of the aforementioned type employ a spindle moistener supply system for supplying moistener to the pads. The typical moistener supply system includes a tank for moistening fluid, a fluid pump coupled to the tank, a main supply conduit for directing fluid from the pump, a distribution manifold connected to an outlet of the main supply conduit, and a plurality of moistener supply conduits, each of which leads form the distribution manifold to the column(s) of pads associated with a particular drum unit. The moistener usually comprises a premixed solution of water and a cleaner. The cleaner may be soap or, more typically, any of a variety of commercially available cleaners manufactured for the specific purpose of cleaning the spindles of a cotton picking machine.

Proper operation of the spindle moistener supply system is a very critical part of the cotton picking process, requiring relatively precise control of the flow of moistener to the spindles. If too much moistener is supplied, the cotton will become overly wet and wrap around the spindles. However, if not enough moistener is supplied, the spindles will become tacky from the cotton sap and cause cotton to wrap around the spindles for this different reason. These factors vary with the characteristics of the cotton being harvested. Optimum moistener flow rate may vary from day to day, during the course of the day, or from field to field.

In practice, most operators do not make the necessary adjustments to a moistener supply system to obtain good spindle cleaning without over-wetting. They instead run the pump at high pressures and high flow rates on the mistaken assumption that "more is better." In fact, in a typical machine properly set to run at about 15 psi and 0.4 gallons per minute under average conditions, most operators run the machine closer to 30 to 35 psi or 0.65 and 0.7 gallons per minute. In order to eliminate the wraps and chokes from the resultant excess flow, the operators often screw the doffers down to a position that is at or near their maximum setting. As a result, the doffers and spindles wear out relatively quickly, and the pump is overworked.

The above problems are exacerbated by the fact that optimal spindle cleaning is a function of not only moistener flow rate, but also cleaner concentration. At a given moistener flow rate, the cleaner concentration should be heavier for relatively wet, sap-laden cotton than for relatively dry cotton. Cotton dryness levels change during the course of the day and from field to field, leading to relatively dramatic variations in optimal cleaner concentration in short periods of time. Hence, optimum moistening requires proper selection and frequent alteration of both the cleaner concentration level and the moistener flow rate. Heretofore available cotton picking machines were incapable of meeting this need. In fact, premixed moistener in a given tank has a cleaner concentration that cannot be varied except by adding more water or more cleaner to the tank. Both measures are difficult to implement in the field and are imprecise, at best.

The need therefore has arisen to provide a spindle moistener supply system for a cotton picking machine that can be adjusted to alter cleaner concentration instead of or in addition to altering moistener flow rate, thereby permitting the moistener characteristics to be tailored to meet the needs of the prevailing operating conditions.

The need has also arisen to provide a method of adjusting the operation of spindle moistener supply system of a cotton picking machine to meet the moistening needs of the prevailing operating conditions.

SUMMARY OF THE INVENTION

In accordance with the invention, a moistener supply system for a cotton picking machine includes a cleaner injection system that transfers cleaner to moistening pads from a cleaner source that is separate from the water source. The outlet of the cleaner injection system preferably is disposed at a location that assures good mixing of the cleaner with the water before the resultant moistener is dispensed onto the moistening pads. Alternatively, the cleaner injection system could be physically entirely separate from the water supply system, in which case it would dispense cleaner directly onto the moistening pads.

Cleaner flow rate preferably is slaved to, i.e., varies automatically with, water flow rate in order to maintain a generally constant cleaner concentration in the moistener in the absence of external intervention. In an especially preferred embodiment, the cleaner flow rate can also be adjusted independently of the water flow rate to vary the cleaner concentration to meet the needs of the prevailing operating conditions. The cleaner concentration adjustment may be effected manually, automatically, or through a combination of both, preferably by adjusting the effective output of a pump of the cleaner injection system. The pump may, for example, comprise a venturi type pump that has an internal or external adjustable flow restrictor, a variable displacement or variable speed mechanical pump, a variable displacement or variable speed electrical pump, or a variable flow bypass valve or pressure regulator operating in concert with a constant output or variable output electrical or mechanical pump.

A method of injecting cleaner into a cotton picking machine moistener supply system is also disclosed.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. System Overview

Figure 1:
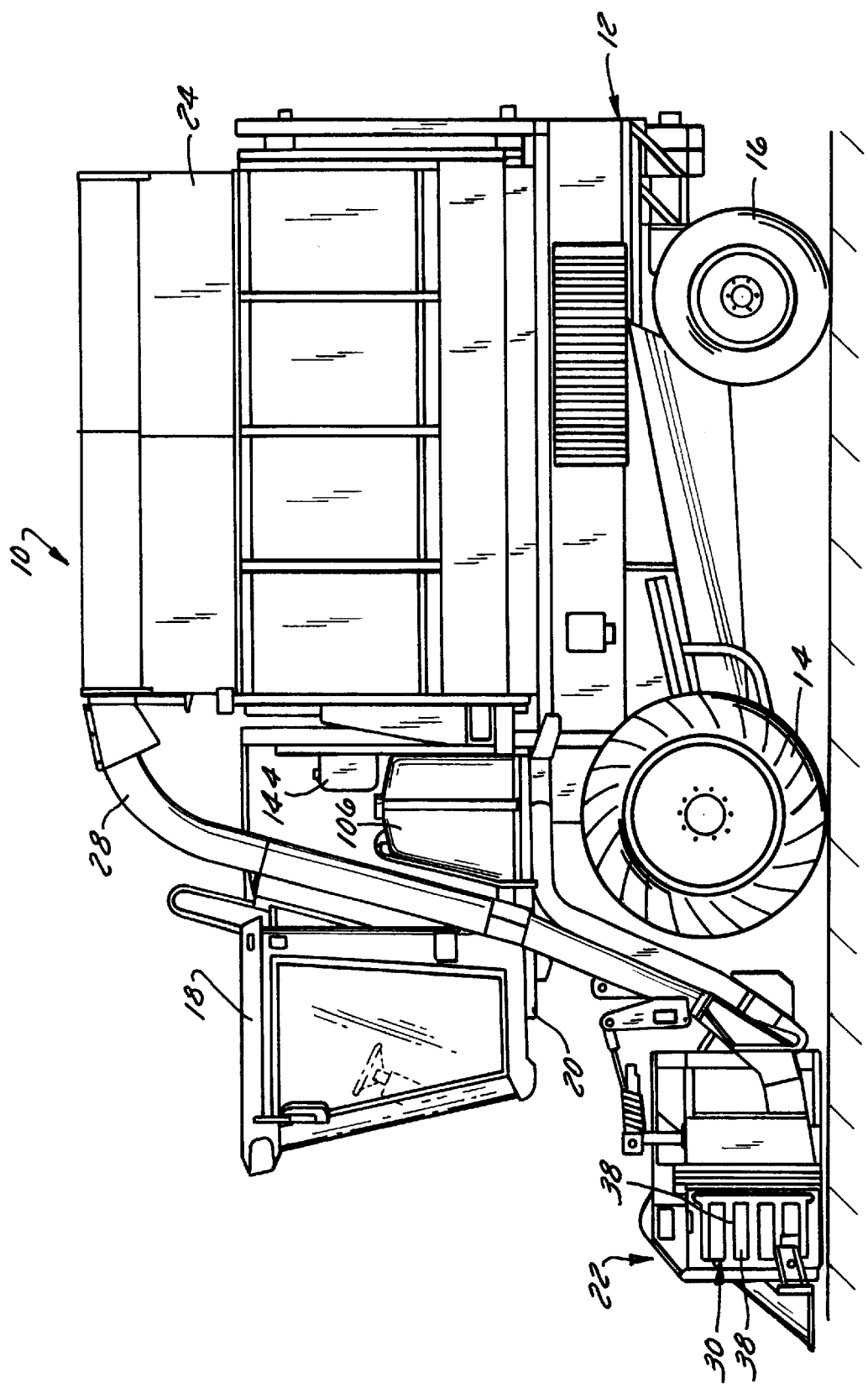
FIG. 1 is a somewhat schematic, side elevation view of a cotton picking machine incorporating a moistener supply system constructed in accordance with the present invention.
Figure 2:
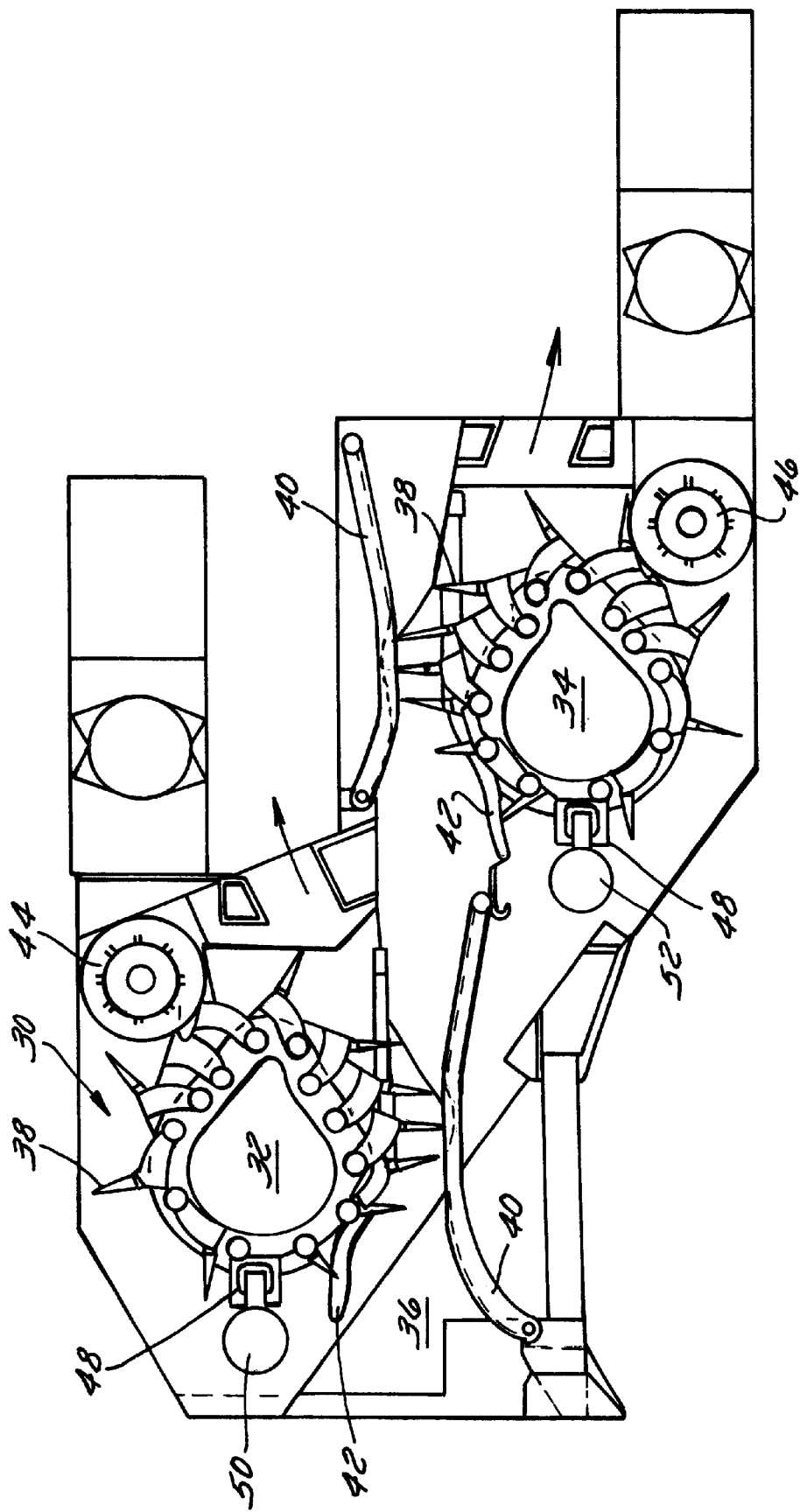
FIG. 2 is a generally schematic, top plan view of a drum unit of the cotton picking machine of FIG. 1.
Figure 3:
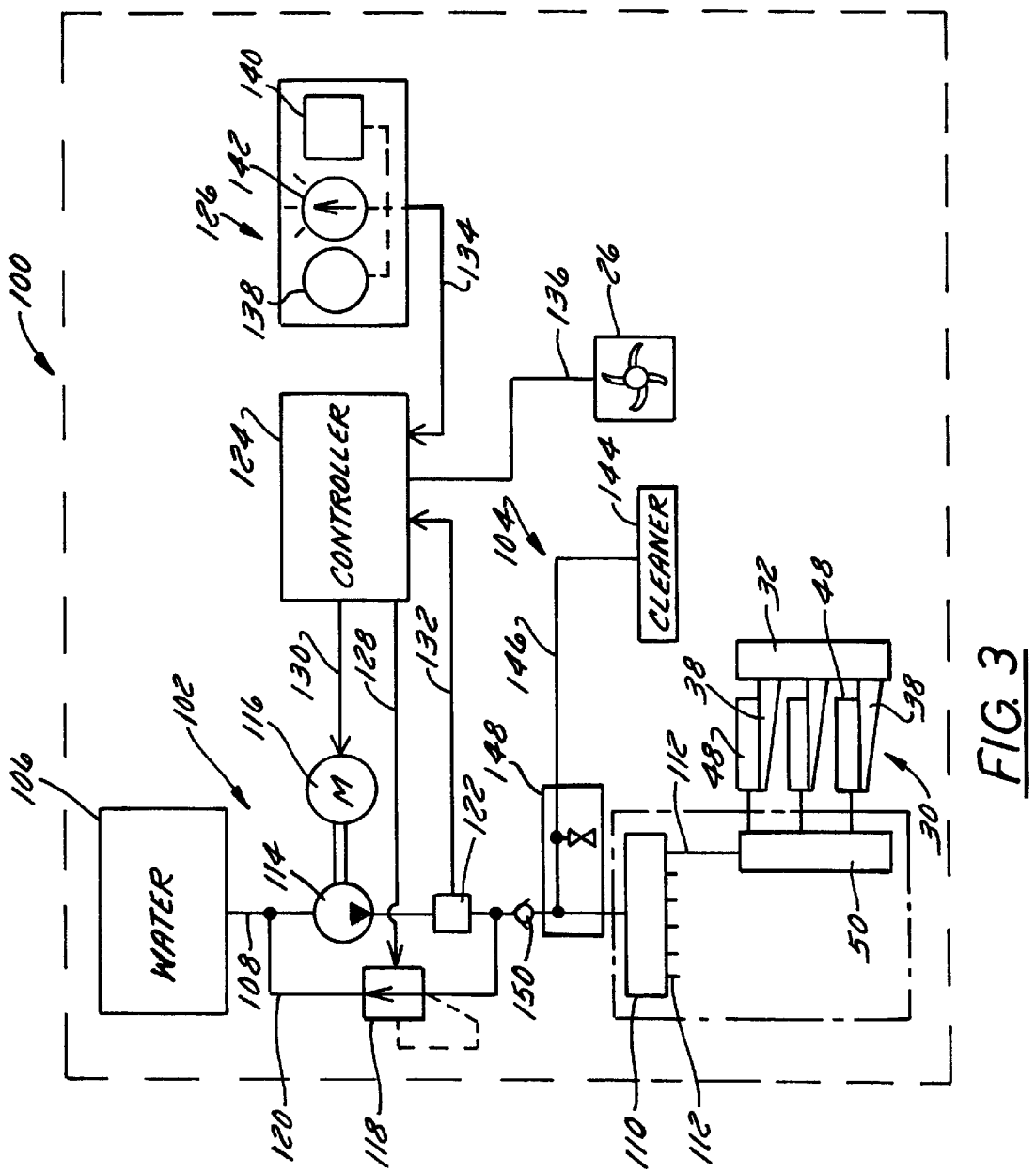
FIG. 3 schematically illustrates a cotton spindle moistener supply system usable on the cotton picking machine of FIG. 1 and constructed in accordance with a first preferred embodiment of the invention.

Turning now to the drawings and initially to FIGS. 1–3, a cotton picking machine 10 is illustrated that incorporates a moistener supply system constructed in accordance with the present invention. The machine 10 includes a self-propelled chassis 12 that is supported on drive and driven wheels 14 and 16. The machine 10 is operated by an operator stationed in a cab 18 mounted on a platform 20 on the front end portion of the chassis 12. A harvesting head 22 extends forwardly from the chassis 12. The head 22 is adapted to remove cotton from plants and to transfer the removed cotton to a cage or bin 24 located behind the platform 20. More specifically, a fan 26 (FIGS. 3–5) blows the removed cotton through a duct 28 and into the cage 24 from above. The cage 24 can be emptied in a manner that is, per se, well known by raising it relative to the chassis 12 and transferring the cotton from the machine 10 using a conventional conveyor (not shown).

Referring to FIGS. 1 and 2, the harvesting head 22 is divided into a number of drum units 30 (typically 2 to 6), each of which is configured to remove cotton from bolls in an associated row of cotton plants. The drum units 30 are identical for each row. For the sake of concision, only the left-most drum unit 30 will be described, it being understood that the description applies equally to the remaining drum units. The drum unit 30 is provided with front and rear spindle rotors 32 and 34 transversely separated by a fore-and-aft plant passage 36. Compressor sheets 40 and slat bars 42 are disposed opposite the rotors 32 and 34 to direct plants toward the spindles 38 for maximum contact with spindles 38. A doffer 44, 46 is located adjacent each rotor 32, 34 for removing the cotton from the spindles 38.

The spindles 38 of each rotor 32, 34 are cleaned via a plurality of vertically spaced moistening pads 48. The moistening pads 48 are of generally known design. The pads 48 associated with the spindles 38 of each rotor 32, 34 are mounted on a respective moistener column 50, 52 to form a moistener stack or assembly for each rotor. The pads 48 of each column 50 are positioned to wipe and apply moisture to the rotating spindles 38 as the spindles sweep around their revolutionary paths during picking. One such pad is provided for each spindle 38, thereby moistening the spindles to avoid undesirable accretion of plant juices and dust on them.

The moistening pads 48 are supplied with a moistener via a moistener supply system that supplies water and cleaner to the pads 48 from separate tanks or other sources. Cleaner is transferred from the cleaner source via a cleaner injection system. The outlet of the cleaner injection system preferably is positioned at a location that assures good mixing of the cleaner with the water before the resultant moistener is dispensed onto the moistening pads 48. Alternatively, the cleaner injection system could be physically entirely separate from the water supply system, in which case it would dispense cleaner directly onto the moistening pads 48.

Cleaner flow rate preferably is slaved to, i.e., varies automatically with, water flow rate in the absence of external intervention in order to maintain a generally constant cleaner concentration in the moistener. Cleaner flow rate preferably can also be adjusted independently of water flow rate to vary the cleaner concentration to meet the needs of the prevailing operating conditions. As a result, the cleaner concentration can range from a maximum value to handle the maximum sap concentration at the spindles 38 to a minimum of zero if the machine 10 is operating under very dry or "non-green" conditions. The cleaner concentration adjustment may be effected manually, automatically, or through a combination of both, preferably by adjusting the effective output of a pump. The pump may comprise a venturi type pump that has an internal or external adjustable flow restrictor, a variable displacement or variable speed mechanical or electrical pump, and/or an adjustable regulating valve operating in concert with a pump.

Several preferred embodiments of a moistener supply system usable with the invention as thus-far described will now be detailed, it being understood that other moistener supply systems could be employed as well.

2. Construction and Operation of First Embodiment of the Moistener Supply System Referring now to FIG. 3, a moistener supply system constructed in accordance with a first embodiment of the invention is designated generally by the reference numeral 100. Moistener supply system 100 includes a separate water system 102 and a cleaner injection system 104. Preferably, the two systems 102 and 104 are controlled to normally maintain the relative flow rates of water and cleaner within a desired range while permitting manual or automatic adjustment of one or both of the water flow rate and the cleaner flow rate, thereby permitting adjustments of both the moistener flow rate and the cleaner concentration.

Still referring to FIG. 3, the water supply system 102 includes a water tank 106, a distribution system fluidically coupling the water tank to the moistening columns, and a pumping system that pumps water through the distribution system from the water tank at a controlled, variable rate. The water tank 106 is relatively large, typically having a capacity of about 450 gallons. It is mounted on the chassis 12 behind the platform 20 (see FIG. 1). Alternatively, it could be strapped underneath the rear end of the chassis 12 or mounted at any other suitable location on the cotton picking machine 10.

The distribution system includes a main supply conduit 108, a distribution manifold 110, and a plurality of moistener assembly supply conduits 112. Each of the moistener assembly supply conduits 112 leads from the distribution manifold 110 to the moistener column(s) 50, 52 of an associated drum unit 30. In the illustrated embodiment in which two rotors 32, 34 and moistener columns 50, 52 are provided in each drum unit 30, each moistener assembly supply conduit 112 supplies moistener to two moistener columns.

The pumping system may comprise any device or combination of devices capable of pumping water to the moistener columns 50, 52 from the water tank 106 at a controlled, variable rate. In the illustrated embodiment, the pumping system comprises an electrically powered pump 114 located in the main supply conduit 108. The inlet of pump 114 is coupled to the water tank 106, while the outlet of pump 114 delivers a pressurized stream to the distribution manifold 110 via the main supply conduit 108. The pump 114 is driven by an electric motor 116, preferably at a constant rate near the pump's rated limit. The effective output of the pump 114 is varied by operation of an electrically operated regulator or bypass valve 118 located in a bypass line 120. The bypass line 120 has an inlet connected to the main supply conduit 108 downstream of the pump 114 and an outlet connected to the main supply conduit 108 upstream of the pump 114. The bypass valve 118 includes an internal or external proportional control solenoid or the like that permits a controlled backflow of water trough the bypass line 120 to set or adjust the effective flow rate from the pump 114. Alternatively, the bypass valve 118 could be eliminated, and the output of the pump 114 could be adjusted by varying the speed of the motor 116.

Still referring to FIG. 3, the pumping system also includes a pressure transducer 122 located in the main supply conduit 108, an electronic controller 124, and an operator interface 126. The controller 124 is coupled to the bypass valve 118, the motor 116, the pressure transducer 122, and the operator interface 126 via respective signal wires 128, 130, 132, and 134. The operator interface 126, which preferably is located in the cab 18 (FIG. 1), includes a signal generator 138, a switch 140, and an indicator or readout 142. The signal generator 138 is coupled to the bypass valve 118 via the controller 124 and the signal wires 132 and 134. The operator can alter the effective flow rate of the pump 114 by operating the switch 140, based on readings generated by the pressure transducer 122 and supplied by the indicator 142, to alter the setting of the signal generator 138 and, thereby, adjust the setting of the bypass valve 118. The controller 124 is also coupled to the fan 26 via a signal wire 136 in order to obtain an indication of the operational state of the cotton picking machine 10. Specifically, the controller 124 transmits a signal to the motor 116 via the signal wire 130 whenever the fan 26 is operating, thereby assuring a constant supply of moistener for the spindles 38 during spindle operation. The manner in which these devices cooperate with one another to control operation of a pumping system similar to the illustrated system (but lacking the bypass valve) is described, for example, in U.S. Pat. No. 5,467,882 to Panoushek, the subject matter of which is hereby incorporated by reference.

The cleaner injection system 104 of this embodiment is designed to be a relatively simple, passive system with manual adjustment capability. The system 104 includes a source such as a cleaner supply tank 144, a cleaner supply conduit 146, and a flow controller that permits the cleaner flow rate through the cleaner supply conduit to be selectively adjusted. The cleaner supply tank 144 is relatively small, having a typical capacity in the order of 5 gallons. The tank 144 may be mounted at any suitable location on the cotton picking machine 10 such as above the water tank 106 as seen in FIG. 1.

The cleaner supply conduit 146 has an inlet connected to the outlet of the cleaner supply tank 144 and an outlet connected to the water supply system 102 at a location downstream of the bypass valve 118. In the illustrated embodiment, the outlet of the cleaner supply conduit 146 is connected to the main supply conduit 108 between the bypass line inlet and the distribution manifold 110. A check valve 150 is located in the main supply conduit 108 between the bypass line inlet and the cleaner supply conduit outlet to prevent backflow through the bypass valve 118 from the cleaner supply conduit 146.

The flow controller may comprise any of a variety of mechanical, electrical, or electromechanical devices capable of transferring cleaner through the cleaner supply conduit 146 from the cleaner supply tank 144 at a controlled, variable rate. The flow controller of this embodiment comprises a venturi pump/variable flow restrictor assembly 148 that transfers cleaner through the cleaner supply conduit 146 at a rate determined by 1) the magnitude of the venturi effect generated by water flowing through the main supply conduit 108 and 2) the setting of an internal or external settable restrictor of the assembly 148. Devices having this capability are quite common in other applications. For instance, they are often used by gardeners as an attachment to a water hose to dispense fertilizer or the like from a canister at a rate that varies with the water flow rate through the water hose and that can be adjusted by a dial or other attachment on the device. When used in the present embodiment of the invention, manual manipulation of the dial or other attachment varies a restriction in the cleaner supply conduit 146, thereby varying the flow rate of cleaner through the conduit 146 under the prevailing water flow rate through the main supply conduit 108. The dial or other attachment could be mounted directly on the assembly 148, at another location in the vicinity of the harvesting head 22, in the cab 18, or at any other location on the machine 10 (see FIG. 1).

In use, water flows through the main supply conduit 108 and into the distribution manifold 110 at a rate determined by the setting of the bypass valve 118 and maintained by the controller 124 under the control of the switch 140. Operation of the venturi pump of the assembly 148 causes cleaner to flow through the cleaner supply conduit 146 from the cleaner supply tank 144 at a rate that is dependent upon the water flow rate through the main supply conduit 108. The cleaner then mixes with the water to form a moistener that flows into the distribution manifold 110, through the moistener assembly supply conduits 112, and to the moistening pads 48. The cleaner concentration in the moistener can be adjusted by manual adjustment of the setting of the variable flow restrictor of the assembly 148 in order to adjust the cleaner flow rate through the assembly 148.

In practice, the operator will likely inspect the condition of the spindles 38 upon emptying the storage cage 24 (typically occurring about every twenty minutes during operation of the machine) (see FIG. 1). The operator will decrease the restriction provided by the restrictor to increase the cleaner flow rate through the cleaner supply conduit 146 if he or she observes a build-up of sap on the spindles 38 and resultant spindle wrap. Conversely, if the spindles 38 seem soapy, indicating that the cotton is drying out and that a less concentrated cleaner solution is required, he or she will increase the restriction provided by the restrictor to decrease the cleaner flow rate in the cleaner supply conduit 146.

3. Construction and Operation of the Second Embodiment

Figure 4:
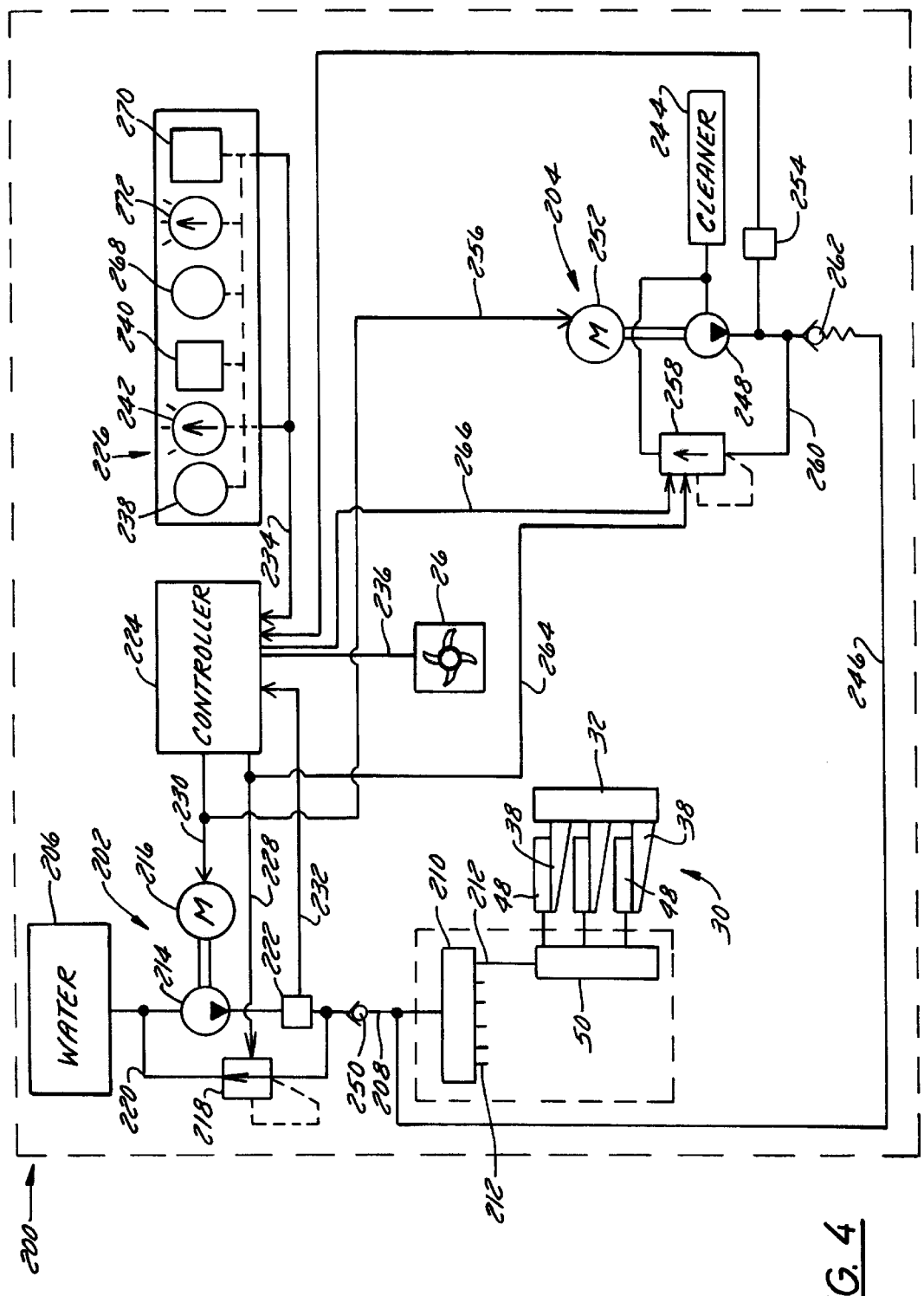
FIG. 4 schematically illustrates a cotton spindle moistener supply system usable on the cotton picking machine of FIG. 1 and constructed in accordance with a second preferred embodiment of the invention.

Referring now to FIG. 4, a cotton spindle moistener supply system 200 is illustrated that differs from the system of FIG. 3 in that it employs a somewhat more sophisticated cleaner injection system 204 with an essentially identical water supply system 202. That is, rather than relying on a venturi pump and a manually adjustable restrictor to control the flow of cleaner through the cleaner injection system 204, the system 204 employs an electrically powered pump 248 and an electronic switch coupled to the controller 224. The moistener supply system 200 of this embodiment is otherwise identical to the moistener supply system 100 of the first embodiment. Its components are designated by the same reference numerals, incremented by 100. The system 200 therefore includes a water supply system 202 including a pump 214, a motor 216, a bypass valve 218, and a water tank 206. It supplies moistener to the same pads 48 as in the first embodiment via a tank 206, conduits 208, 212, and a distribution manifold 210. The bypass valve 218 and motor 216 are controlled by a controller 224 using an operator interface 226 based on signals obtained from a pressure transducer 222. Operator interface 226 includes a signal generator 238, a switch 240, and an indicator 242. Signals are transmitted to and from the controller 224 via wires 228, 230, 232, 234, and 236 as described above.

The cleaner injection system 204 of this embodiment includes a cleaner supply tank 244, a cleaner supply conduit 246, and a cleaner supply pump 248. The tank 244 and conduit 246 are identical to the corresponding structures of the first embodiment. The pump 248 pumps cleaner from the cleaner supply tank 244, through the cleaner supply conduit 246, and to the main supply conduit 208 at a controlled, variable rate. The pump 248 may be similar in construction to the water supply pump 214 but can be a much smaller pump operating at a much smaller flow rate. Typically, the cleaner supply pump 248 will operate at a rate of ¼ to ½ gallons per hour as opposed to 25 to 50 gallons per hour for the water supply pump 214.

The pump 248 is operated by an electric motor 252 coupled to the controller 224 via a signal wire 256. The effective output of the pump 248 preferably is slaved to the output of the pump 214 while being independently variable. This effect could be achieved by suitable control of the motor 252 or, as in the illustrated embodiment, could be achieved by suitable control of a bypass valve 258 located in a bypass line 260 while constantly operating the pump 248 at or near its maximum rated output. A check valve 262 is provided in the cleaner supply conduit to prevent backflow of moistener through the bypass line 260 and to the cleaner supply tank 244.

The bypass valve 258 includes an internal or external proportional control solenoid valve, or the like slaved to the water pump bypass valve 218 and independently adjustable by the operator. Specifically, valve 258 receives energizing current from a first signal wire 264 connected to the water supply pump bypass valve signal wire 228 and a signal wire 266 coupled directly to the controller 224. In the absence of external intervention, the signal transmitted through the first signal wire 264 energizes the valve 258 proportionally to the energizing state of the bypass valve 218 to maintain an effective cleaner flow rate through the cleaner supply conduit 246 that is proportional to the prevailing water flow rate through the main supply conduit 208. The operator can adjust the setting of the bypass valve 258 by manipulating a switch 270 in the operator interface 226 to adjust the output from a signal generator 268, thereby altering the effective flow rate of the pump 248 for a given water flow rate. The operator may base his or her adjustment on readings obtained from an indicator 272 located within the operator interface 226 and displaying information obtained from a pressure transducer 254. Alternatively, the output from the signal generator 268 could be adjusted automatically based on feedback obtained, e.g., from an optical sensor or other sensor that monitors the cleanness of the spindles 38.

It can thus be seen that the control of the valve 258 using signals from the two control wires 264 and 266 electronically achieves the same or similar effect of the venturi pump/restrictor assembly of the first embodiment. That is, in the absence of external intervention, the control wire 264 energizes the valve 258 to inject cleaner into the main supply conduit 208 at a rate that is proportional to the flow rate of water though the main supply conduit 208. In addition, the cleaner flow rate can be adjusted upwardly or downwardly to adjust the cleaner concentration by suitable manipulation of the signal generator 268.

4. Construction and Operation of the Third Embodiment

The cleaner injection systems as thus far described supplies cleaner to the water supply system at a single location upstream of the distribution manifold. As a result, all drum units are supplied with a moistener having the same cleaner concentration. However, it may be desirable in some circumstances to be able to vary the cleaner concentration on a row-by-row basis. For example, "skip row" situations are common in some countries such as China in which one or two rows of each set of cotton rows harvested by the cotton picking machine are absent in order to accommodate passage of other equipment, or in order to accommodate particular planting equipment. Individual control of cleaner to the drum units for the skipped rows permits the cleaner to be shut off to those rows. In addition, it is possible due, e.g., to uneven wear of system components that a heavier cleaner concentration will be desired in some drum units 30 of the machine 10 than others to obtain uniform spindle cleaning.

Figure 5:
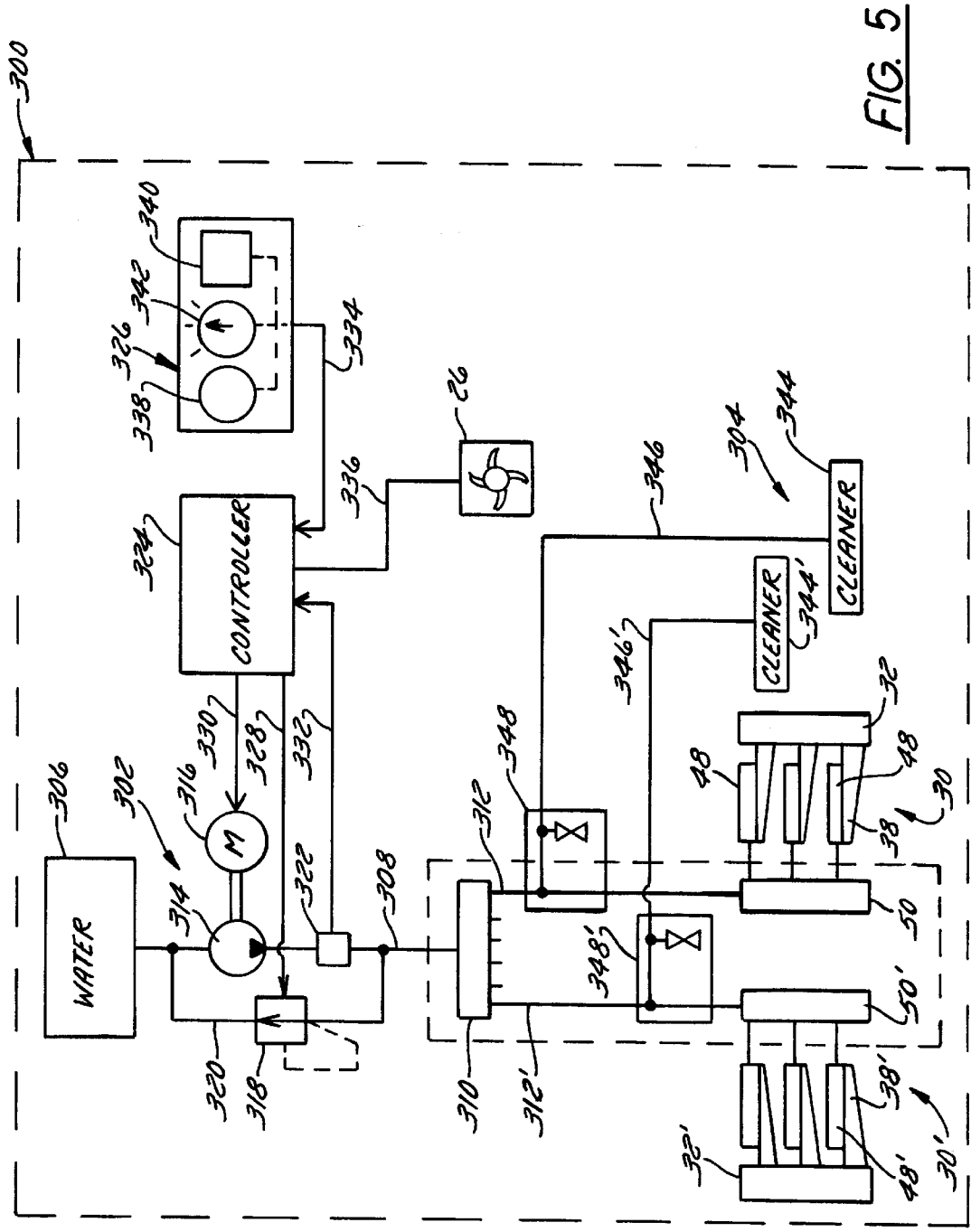
FIG. 5 schematically illustrates a cotton spindle moistener supply system usable on the cotton picking machine of FIG. 1 and constructed in accordance with a third preferred embodiment of the invention.

Turning now to FIG. 5, a moistener supply system 300 is illustrated that is capable of individually adjusting the flow of cleaner to each drum unit 30. The system 300 includes a water supply system 302 and a cleaner injection system 304 divided into a plurality of cleaner supply subsystems, each of which is associated with a particular drum unit (two such subsystems are illustrated in FIG. 5 for drum units 30, 30', it being understood that other, identical subsystems would be provided for the remaining drum units). The moistener supply system 300 is otherwise identical to the moistener supply system of the first embodiment. Components of the third embodiment corresponding to components of the first embodiment are designated by the same reference numerals, incremented by 200. System 300 therefore includes a water tank 306, a water supply pump 314, a motor 316, a bypass valve 318, and a controller 324. It supplies moistener to the same moistening pads 48 as in the first embodiment via an essentially identical main supply conduit 308, distribution manifold 310, and moistener supply conduits 312, 312', etc. The bypass valve 318 and motor 316 are controlled by an operator interface 326 based on signals obtained from a pressure transducer 322. The operator interface 326 includes a signal generator 338, a switch 340, and an indicator 342. Signals are transmitted to and from the controller 324 via signal wires 328, 330, 332, 334, and 336.

Each cleaner injection subsystem of this embodiment includes a relatively small cleaner supply tank 344, 344', a cleaner supply conduit 346, 346', and a cleaner flow rate controller in the form of a venturi pump/variable restrictor assembly 348, 348'. The cleaner supply tanks 344, 344' store the same cleaner as in the first embodiment but are commensurately smaller than the cleaner supply tank 144 of the first embodiment (a six row cotton picking machine having six cleaner injection subsystems and a 450 gallon water tank preferably employs six cleaner supply tanks each having a capacity on the order of one-to-two gallons). The cleaner supply conduit 346, 346' associated with each drum unit 30, 30' is coupled to an associated moistener assembly supply conduit 312, 312' at a location upstream of the juncture between the columns 50, 52 for the front and rear rotors 32, 34 of that drum unit. Water flow through the moistener assembly supply conduits 312, 312' induces a venturi effect in the cleaner supply conduits 346, 346' that draws cleaner through the cleaner supply conduits 346, 346' and into the moistener assembly supply conduits 312, 312' at a rate that is proportional to the water flow rate through the moistener assembly supply conduits. The cleaner flow rate can be adjusted by varying the restriction in the cleaner supply conduits 346, 346' using the flow restrictor of the associated assembly 348, 348'. A separate assembly 348, 348' is preferably provided for each conduit 346, 346', thereby permitting the operator to tailor the cleaner concentration to meet the needs of each individual drum unit 30, 30', etc. It is conceivable, however, that two or more drum units could be serviced by each pump/restrictor assembly 348, 348' so that a single dial or other switch could, depending upon the construction of a particular system, be used to adjust cleaner concentration in the moistener assembly from anywhere for one to all six drum units.

Although this embodiment is described in conjunction with a venturi-type pump and a manually controlled restrictor, it should be apparent from the above that cleaner could be supplied to the individual moistener assembly supply conduits 312, 312', etc. via electronically controlled subsystems, each of which is similar or identical in construction and operation to the electronically controlled cleaner injection system of FIG. 4.

It should also be apparent from the above that many changes and modifications could be made to the present invention without departing from the spirit thereof. For instance, the water supply system could be replaced with virtually any system capable of supplying water from a supply tank or other source to the distribution manifold. In addition, cleaner could be injected into or otherwise supplied to the moistener supply system at other locations than those described above. For instance, the cleaner supply conduits could empty directly onto the moistening pads so as to maintain an independent supply of water and cleaner to the pads. The scope of the additional changes will become apparent from a reading of the appended claims.

We claim:

1. A cotton picking machine spindle moistener supply system for supplying water and liquid cleaner at selectively variable concentrations to said spindles, said moistening supply system comprising:
   (A) a plurality of moistener assemblies, each of which is configured to dispense moistener to pads that clean spindles on a rotor of a cotton picking machine;
   (B) a distribution manifold;
   (C) a plurality of moistener assembly supply conduits, each of which connects said distribution manifold to at least one of said plurality of moistener assemblies and permits fluid flow from said distribution manifold to said at least one of said plurality of said moistener assemblies;
   (D) a water tank;
   (E) a main supply conduit which connects said water tank to said distribution manifold to permit fluid flow from said water tank to said distribution manifold; and
   (F) a cleaner injection system comprising
      (1) a cleaner supply tank separate from said water tank,
      (2) a cleaner supply conduit which connects said cleaner supply tank to said main supply conduit and permits fluid flow from cleaner supply tank to said main supply conduit,
      (3) a selectively variable flow restrictor which controls the cleaner flow rate through said cleaner supply conduit independently of the water flow rate through said main supply conduit such that the concentration of cleaner dispensed to said pads may be selectively varied by manipulation of said variable flow restrictor.

2. The moistener supply system as defined in claim 1, wherein said flow controller comprises a variable output pump.

3. The moistener supply system as defined in claim 2, further comprising an electronic controller which controls operation of said pump.

4. The moistener supply system as defined in claim 3, further comprising a switch which is in electrical communication with said electronic controller and which is manually manipulatable to control operation of said pump.

5. A cotton picking machine spindle moistener supply system for supplying water and liquid cleaner at selectively variable concentrations to said spindles, said moistener supply system comprising:
   (A) a plurality of moistener assemblies, each of which is configured to dispense moistener to pads that clean spindles on a rotor of a cotton picking machine;
   (B) a distribution manifold;
   (C) a plurality of moistener assembly supply conduits, each of which connects said distribution manifold to at least one of said plurality of moistener assemblies and permits fluid flow from said distribution manifold to said at lest one of said plurality of moistener assemblies;
   (D) a water tank;
   (E) a main supply conduit which connects said water tank to said distribution manifold to permit fluid flow from said water tank to said distribution manifold; and
   (F) a cleaner injection system comprising
      (1) a plurality of cleaner supply tanks separate from said water tank,
      (2) a plurality of cleaner supply conduits, each of which connects an associated one of said cleaner supply tanks to at least one moistener assembly supply conduit to permit fluid flow from said associated cleaner supply tanks to said at least one moistener assembly,
      (3) a selectively variable flow restrictor which controls the flow rate through at least one of said cleaner supply conduits independently of the water flow rate through the associated moistener assembly supply conduits such that the concentration of cleaner dispensed to said pads may be selectively varied by manipulation of said variable flow restrictor.

6. The cotton picking machine spindle moistener supply system of claim 5, further including:

a control system to monitor and adjust the relative flow rates of water and cleaner and to normally maintain them within a desired range; and an adjustment mechanism connected and located to permit adjustments of both the moistener flow rate and the cleaner concentration.

7. A cotton picking machine spindle moistener supply system for supplying water and liquid cleaner at variable concentrations to said spindles, said moistener supply system comprising:

(A) a plurality of moistener assemblies, each of which is configured to dispense moistener to pads that clean spindles on a rotor of a cotton picking machine;

(B) a distribution manifold;

(C) a plurality of moistener assembly supply conduits each of which connects said distribution manifold to at least one of said plurality of said moistener assemblies and permits fluid flow from said distribution manifold to said at least on of said plurality of said moistener assemblies;

(D) a water tank;

(E) a main supply conduit which connects said water tank to said distribution manifold to permit fluid flow from said water tank to said distribution manifold;

(F) a water supply system which pumps water through said main supply conduit from said water tank; and (G) a cleaner injection system comprising
  (1) a cleaner supply tank separate from said water tank,
  (2) a cleaner supply conduit which connects said cleaner supply tank to said main supply conduit an permits fluid flow from said cleaner supply tank to said main supply conduit,
  (3) a selectively variable output cleaner supply pump which is located in said cleaner supply conduit; and
  (4) a controller which controls operation of said cleaner supply pump to selectively vary the output thereof whereby the concentration of cleaner dispensed to said pads may be varied by manipulation of said controller.

8. The moistener supply system as defined in claim 7, wherein said cleaner supply pump is electrically powered and said controller comprises an electronic controller.

9. The moistener supply system as defined in claim 8, wherein said controller further comprises a manually-operated switch that transmits a control signal to said electronic controller to vary the output of said cleaner supply pump independently of a current operating state of said water pumping system.

10. The moistener supply system as defined in claim 7, wherein the output of said cleaner supply pump is varied by adjusting a setting of a regulator valve coupled to said pump.

11. A method of applying moistener to the moving spindles of a cotton picking machine comprising the steps of:

(A) providing a cotton picking machine comprising at least one row-type harvesting unit with a plurality of generally vertically-spaced rotating spindles thereon, and a moistener supply system including a plurality of moistening pads positioned to wipe respective spindles and apply a moistener, thereby reducing the accretion of foreign materials that would otherwise reduce the harvesting efficacy of the spindles;

(B) transferring water via a water supply conduit from a water reservoir to the moistening pads;

(C) transferring liquid cleaner to the water supply conduit via a cleaner supply conduit from a cleaner reservoir that is separate from said water reservoir;

(D) adjusting the cleaner flow rate through the cleaner supply conduit so as to selectively alter the concentration of cleaner in the moistener.

12. The method as defined in claim 11, wherein the cleaner transferring step further comprises drawing cleaner into a water supply conduit from a cleaner supply conduit under a venturi effect generated by water flowing through said water supply conduit.

13. The method as defined in claim 11, wherein the cleaner transferring step further comprises pumping cleaner to a water supply conduit from a cleaner supply tank at a rate that varies with the output of a variable output cleaner pump.

14. The method as defined in claim 13, further comprising the step of manually manipulating a switch to vary the output of said cleaner pump.

* * * * *